(12) United States Patent
Painczyk et al.

(10) Patent No.: US 12,186,850 B2
(45) Date of Patent: Jan. 7, 2025

(54) DEVICE FOR DAMPING THE VIBRATIONS OF A SPINDLE OF A MACHINE TOOL, WHICH SPINDLE ROTATES ABOUT AN AXIS OF ROTATION

(71) Applicant: Präwema Antriebstechnik GmbH, Eschwege/Werra (DE)

(72) Inventors: Ralf Painczyk, Nentershausen (DE); Jörg Reinhardt, Berka v.d.H. (DE)

(73) Assignee: Präwema Antriebstechnik GmbH, Eschwege/Werra (DE)

( * ) Notice: Subject to any disclaimer, the term of this patent is extended or adjusted under 35 U.S.C. 154(b) by 564 days.

(21) Appl. No.: 17/474,137

(22) Filed: Sep. 14, 2021

(65) Prior Publication Data
US 2022/0080544 A1 Mar. 17, 2022

(30) Foreign Application Priority Data
Sep. 15, 2020 (DE) .......................... 10 2020 124 019

(51) Int. Cl.
*F16F 7/104* (2006.01)
*B23G 11/00* (2006.01)
(Continued)

(52) U.S. Cl.
CPC ............ *B23Q 11/0032* (2013.01); *B23Q 1/70* (2013.01); *F16F 5/00* (2013.01); *F16F 9/10* (2013.01); *F16F 9/53* (2013.01); *F16F 2224/048* (2013.01)

(58) Field of Classification Search
CPC ......... B23Q 11/0032; B23Q 1/70; F16F 5/00; F16F 9/10; F16F 9/12; F16F 9/53; F16F 7/104; F16F 7/108; F16F 2224/048
See application file for complete search history.

(56) References Cited

U.S. PATENT DOCUMENTS

| | | |
|---|---|---|
| 2,722,849 A | 11/1955 | O'Connor |
| 3,230,831 A | 1/1966 | Harker |
| | (Continued) | |

FOREIGN PATENT DOCUMENTS

| | | |
|---|---|---|
| BE | 648875 | 6/1964 |
| CN | 87209250 U | 2/1988 |
| | (Continued) | |

*Primary Examiner* — Thomas W Irvin
(74) *Attorney, Agent, or Firm* — The Webb Law Firm

(57) ABSTRACT

The invention makes available a device for damping the vibrations of a spindle of a machine tool, which spindle rotates about an axis of rotation, which device has a central longitudinal axis that is oriented coaxial to the axis of rotation of the spindle during use, and a housing that is provided for torque-proof coupling to the spindle and delimits a housing space that is configured as a ring space oriented coaxial to the central longitudinal axis and surrounds the central longitudinal axis, a ring-shaped damper mass that is arranged to move in the housing space relative to the central longitudinal axis and oriented coaxial to the central longitudinal axis in the rest state, and includes at least one spring element, by way of which the damper mass is movably held on the housing, with elastic resilience, with reference to the central longitudinal axis of the device, at least in the circumference direction of the damper mass. In that in the case of such a device, according to the invention, a gap is present between a circumference surface of the damper mass and an inner surface of the housing, which gap is filled with a viscous damper fluid, and in that, according to the invention, the clear width of the gap filled with the viscous fluid is adjustable, the damping effect can be adapted to the corresponding requirements in a simple manner.

14 Claims, 1 Drawing Sheet

(51) Int. Cl.
 *B23Q 1/70* (2006.01)
 *B23Q 11/00* (2006.01)
 *F16F 5/00* (2006.01)
 *F16F 9/10* (2006.01)
 *F16F 9/12* (2006.01)
 *F16F 9/53* (2006.01)

(56) References Cited

U.S. PATENT DOCUMENTS

| | | |
|---|---|---|
| 7,654,746 B2 | 2/2010 | Ladra et al. |
| 10,962,086 B2 * | 3/2021 | Knopf .................. F16F 15/145 |
| 11,344,986 B2 * | 5/2022 | Lee .......................... B23Q 1/70 |
| 2009/0255368 A1 | 10/2009 | Kiener et al. |
| 2015/0328744 A1 | 11/2015 | Otto et al. |
| 2017/0248190 A1 | 8/2017 | Ganssle-Klenk |

FOREIGN PATENT DOCUMENTS

| | | | |
|---|---|---|---|
| CN | 103291836 A | 9/2013 | |
| DE | 574147 A | 3/1933 | |
| DE | 1233215 B | 8/1967 | |
| DE | 1817244 A1 | 2/1970 | |
| DE | 232092 B1 | 8/1988 | |
| DE | 102004042316 B4 | 11/2008 | |
| DE | 102010048047 A1 | 4/2012 | |
| DE | 102014106926 A1 | 11/2015 | |
| EP | 3210718 A2 | 8/2017 | |
| JP | H0742792 A | 2/1995 | |
| JP | 2784313 B2 * | 8/1998 | .............. F16F 15/16 |
| WO | 03019038 A1 | 3/2003 | |
| WO | 2008095681 A1 | 8/2008 | |

* cited by examiner

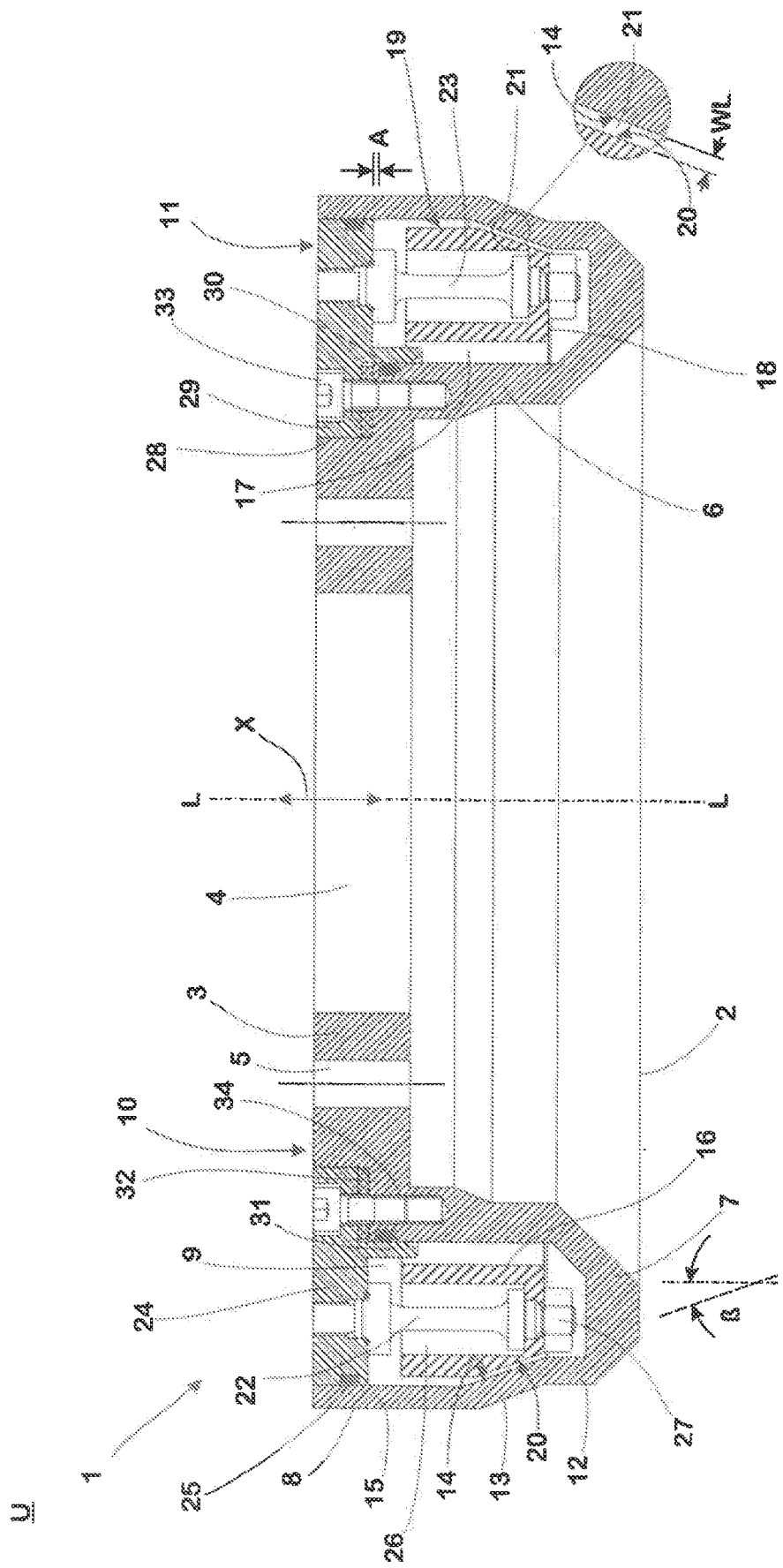

DEVICE FOR DAMPING THE VIBRATIONS OF A SPINDLE OF A MACHINE TOOL, WHICH SPINDLE ROTATES ABOUT AN AXIS OF ROTATION

CROSS-REFERENCE TO RELATED APPLICATION

This application claims priority to German Patent Application No. 10 2020 124 019.8 filed Sep. 15, 2020, the disclosure of which is hereby incorporated by reference in its entirety.

BACKGROUND OF THE INVENTION

Field of the Invention

The invention relates to a device for damping the vibrations of a spindle of a machine tool, which spindle rotates about an axis of rotation, wherein the device has a central longitudinal axis that is oriented coaxial to the axis of rotation of the spindle, as well as a housing that is provided for torque-proof coupling to the spindle and encloses a housing space that is configured as a ring space oriented coaxial to the central longitudinal axis and surrounds the central longitudinal axis, a ring-shaped damper mass that is arranged in the housing space so as to be movable relative to the central longitudinal axis and is oriented coaxial to the central longitudinal axis in the rest state, and at least one spring element by way of which the damper mass is held on the housing with elastic resilience, so as to be movable in the circumference direction of the damper mass.

Description of Related Art

In machine tools, such as, for example, grinding machines, milling machines or drilling machines, the tool is usually held in a tool spindle that is driven to rotate about a tool axis during operation. In this regard, undesirable vibrations occur due to technically unavoidable geometrical insufficiencies, such as asymmetries of the tool spindle, of the tool held by it, in each instance, or of the bearing of the spindle in the housing. These increase with an increasing speed of rotation and not only cause disruptive noises but can also lead to increased wear of the bearing and reduce the quality of the processing result.

In order to damp the vibrations, in practice damper masses, also called "vibration absorbers" in technical language, are used; these are coupled with the tool spindle with elastic resilience and reduce the vibration amplitude of the vibrations triggered by the rotation of the spindle by means of their mass inertia.

An example of a device for vibration damping on rapidly rotating tool spindles, based on such vibration absorbers, is described in DE 10 2004 042 316 B4. In this prior art, the bearing in which the tool spindle is mounted so as to rotate is supported in the housing of the machine tool with elastic resilience. In this regard, a vibration absorber is affixed to the outer ring of the bearing, which absorber is configured in ring shape so that it is arranged coaxially around a segment of the spindle. In this regard, the vibration absorber is supported on the outer bearing ring by means of a spring/damper element. This spring/damper element comprises at least one spring, by way of which the vibration absorber is elastically supported on an inner surface of the bearing ring in the radial direction, with reference to the axis of rotation of the tool spindle. An oil damper configured as a separate component is arranged parallel to the spring, between the outer circumference surface of the vibration absorber and the inner surface of the bearing, so as to improve the damping effect.

An alternative concept for vibration damping is described in DD 232092 B1. There the criticism is expressed, with regard to devices of the type described above, that the vibration absorber can only be designed for one exciter frequency of the spindle or shaft, and as an alternative for the devices criticized in this manner, a damping system is proposed in which damping takes place by way of friction. For this purpose, according to this prior art a friction lining is arranged at the end of the tool spindle, over a holding part fastened on there, which part interacts with a friction lining, which is attached to a bearing part of the bearing in an axially adjustable and elastically supported manner, in which part the spindle is mounted so as to rotate. By adjusting the axial position of the friction lining, it is possible to adjust the friction forces and thereby the damping effect.

Proceeding from the prior art explained above, the task has arisen of creating a device for damping of vibrations, with which it is possible, in a simple manner, to adapt the damping effect to the requirements, in each instance.

The invention has accomplished this task by means of an apparatus that possesses at least the characteristics as described herein.

Advantageous embodiments of the invention are indicated in the dependent claims and will be explained in detail below, along with the general idea of the invention.

SUMMARY OF THE INVENTION

A device according to the invention, for damping the vibrations of a spindle of a machine tool, which spindle rotates about an axis of rotation, therefore has, in agreement with the prior art explained initially, a central longitudinal axis oriented coaxial to the axis of rotation of the spindle during use, and comprises a housing that is provided for torque-proof coupling to the spindle and encloses a ring-shaped housing space that is configured as a ring space oriented coaxial to the central longitudinal axis and surrounds the central longitudinal axis, a ring-shaped damper mass that is arranged in the housing space so as to be movable relative to the central longitudinal axis and is oriented coaxial to the central longitudinal axis in the rest state, and at least one spring element, by way of which the damper mass is movably held on the housing with elastic resilience, with reference to the central longitudinal axis of the device, at least in the circumference direction of the damper mass.

According to the invention, in the case of such a device a gap is present between a circumference surface of the damper mass and an inner surface of the housing, which gap is filled with a viscous damper fluid, wherein the clear width of the gap filled with the viscous fluid is adjustable.

The housing of a vibration damping device according to the invention is thereby connected in a torque-proof manner, during use, with the spindle of a machine tool, which spindle must be damped, in each instance. At the same time, the damper mass is held in the housing in a resiliently elastic manner, by way of a suitable spring element. Because of the mass inertia of the damper mass, relative movements between the damper mass and the housing therefore occur during use. Accordingly, the surfaces of housing and damper mass that delimit the gap filled with the viscous fluid also move. As a result, shear forces act on the fluid present in the gap, which forces in turn produce internal friction in the viscous fluid, by way of which friction the movement of the damper mass is braked accordingly. In this regard, the friction produced in the fluid contained in the gap changes proportional to the clear width of the gap. In the case of greater gap distances, the friction and concomitantly the braking effect is less than in the case of narrow gap widths. By means of the adjustability of the gap width provided for according to the invention, the damping behavior of an apparatus according to the invention can thereby be adapted to the requirements, in each instance, in a simple manner.

By means of the at least one spring element provided for in a device according to the invention, the damping mass is given the resiliently elastic mobility required for vibration damping. This mobility can be oriented in a direction oriented radially relative to the central longitudinal axis, in a direction-oriented axis-parallel to the central longitudinal axis and/or oriented in the circumference direction of the damper mass, wherein an optimal effect is achieved if the resiliently elastic mobility is made possible in each of the stated directions.

The resiliently elastic mounting of the damper mass on the housing can take place, in the case of a device according to the invention, by means of a suitably formed spring element, in any suitable manner that ensures sufficient mobility of the damper mass. Thus the damper mass can be arranged in the housing space to be suspended on the housing by means of the spring element or standing on the housing.

By means of the selection of a suitable spring/damper mass combination, a broad frequency band in which the device according to the invention is effective can be covered in a known manner. Then, as has been explained, damping is adjusted by way of the gap dimension present between housing and damper mass, and by way of the viscosity of the damper fluid used, in each instance.

Here, it has proven to be particularly advantageous, not only with regard to the resilience effect but also with regard to the adjustability of the gap filled with the viscous fluid, if the spring element is configured in rod shape and if its longitudinal axis is oriented axis-parallel to the central longitudinal axis in the rest state. Using such a rod-shaped spring element, it is easily possible to bring about resiliently elastic movement of the damping element in all of the three degrees of freedom mentioned above.

In particular when using rod-shaped, slender spring elements, uniform and particularly effective resiliently elastic support of the damping element of a device according to the invention occurs if the damper mass is supported on the housing by means of at least three spring elements.

In that the spring elements are arranged distributed at regular angular intervals about the central longitudinal axis, it is possible to ensure uniform mounting of the damper mass and concomitantly a uniform damping effect.

With regard to practical implementation of the invention, it is particularly advantageous that according to an embodiment of the invention, the housing space is configured as a ring space oriented coaxial to the central longitudinal axis, so that the ring-shaped damper mass can be inserted into the housing space without problems, and non-uniform mass distributions of the housing, which might otherwise have to be compensated in a complicated manner, are prevented.

Simple adjustability of the clear width of the gap filled with the viscous damper fluid can be achieved in that the gap filled with the viscous fluid is configured between a first slanted surface that is configured on the outer circumference of the damper mass and oriented at a slant with reference to the central longitudinal axis, and a second slanted surface that is arranged on the inner side of the housing assigned to the housing space, lying opposite the slanted surface of the damper mass and oriented at a slant with reference to the central longitudinal axis, in accordance with the slanted orientation of the first slanted surface, and that a setting apparatus for adjusting the relative position of damper mass and housing in a direction oriented axis-parallel to the central longitudinal axis is provided.

In the event that the housing space is ring-shaped, it has been proven to be particularly advantageous, in this regard, with regard to the efficacy of the damping fluid as a damping medium, if the slanted surfaces of damper mass and housing are each configured as conical surfaces that surround the central longitudinal axis, in each instance.

It is conceivable to give the surfaces that delimit the gap filled with the viscous damper fluid, which surfaces are assigned to one another, different or specially shaped contours, so as to directly influence the forces that act locally on the damper fluids and concomitantly the friction that occurs in the fluid. According to an embodiment of the invention that is particularly easy to implement but nevertheless highly effective, however, the slanted surfaces are oriented parallel to one another, as is the case, for example, if the slanted surfaces of damping mass and housing are conical surfaces, in each instance, that surround the central longitudinal axis, in the case of which the conically narrowing slanted surface on the outer circumference side of the damper mass sits in the space delimited by the conically funnel-shaped slanted surface of the housing.

The setting apparatus provided in the case of a device according to the invention, for the purpose of adjustment of the relative position of damper mass and housing, and concomitantly of the width of the gap filled with the viscous fluid, comprises a support element, for example, which is held on the housing in a corresponding axial position, so as to be displaceable axis-parallel to the central longitudinal axis, and is coupled to the at least one spring element holding the damper mass, on the housing side, and a setting element that acts between the housing and the support element and holds the support element in the corresponding axial position, and can be released to adjust the support element out of the fixation position, if necessary. The setting element can be, for example, a setting screw or the like, by means of which the support element can be lowered in the housing or moved out of it. In addition, fixation elements can be provided so as to fix the support element in place in the corresponding reference position, or the setting element itself can be used for this purpose.

An embodiment of the invention that is particularly important for practice, in particular in combination with a housing having a ring-shaped housing space, and can easily be implemented, provides that the support element is an element that surrounds the central longitudinal axis in ring shape and encloses the longitudinal axis in ring shape, which element can be structured in the manner of a plate, for example. Such a support element can be used, in particular, for tightly closing off a correspondingly shaped housing opening. In this way, using a support element formed in this manner, an opening can be closed off that is provided on an end face of the housing, for reasons of production technology or installation technology, wherein the support element then seals off the housing space from the surroundings at the end face in question.

In this regard, the gap between housing and damper mass, filled with viscous fluid, according to the invention, can be sealed off relative to the surroundings in a particularly simple manner, in that the housing space in which the gap in question is provided is filled with the viscous damper fluid so that it is completely sealed off from the surroundings.

All viscous fluids that generate sufficient internal friction to damp the movements of the damper mass of a device according to the invention when they are filled into a gap having a suitable clear width, as the result of the shear forces that are then in effect during use, so as to damp the movements, are suitable for the purposes according to the invention. Oils having a rated viscosity of >5 mm²/s are particularly suitable for this purpose.

As a reference point for the clear width WL of the gap filled with the viscous fluid, in practice a range of 0.1 mm≤WL<1.0 mm can be used.

BRIEF DESCRIPTION OF THE DRAWING

In the following, the invention will be explained in greater detail using a drawing that shows an exemplary embodiment.

FIG. 1 shows a device 1 for vibration damping of a spindle, not shown here, of a machine tool, also not shown here, which can be a milling machine, for example.

DESCRIPTION OF THE INVENTION

The device 1 has a central longitudinal axis L, which coincides with the axis of rotation of the spindle during use, the vibrations of which spindle are supposed to be damped by means of the device 1.

In this regard, the device 1 comprises a housing 2, which has a ring-shaped holding segment 3 that surrounds the central longitudinal axis L. The holding segment 3 is oriented normal to the central longitudinal axis L and encloses a central opening 4 in which the spindle sits during use. For torque-proof coupling of the device 1 to the spindle, passage openings 5 are formed in the holding segment 3, oriented axis-parallel to the central longitudinal axis L and distributed about the central longitudinal axis L at regular angular intervals.

The holding segment 3 makes a transition into an inner wall segment 6 of the housing 2, which segment extends axis-parallel to the central longitudinal axis L and surrounds the central longitudinal axis L in ring shape. A bottom 7 of the housing 2, which also surrounds the central longitudinal axis L in ring shape and is oriented normal to the central longitudinal axis L, is also connected with the inner wall segment 6.

The outer border of the housing 2 on the circumference side is formed by an outer wall segment 8 that surrounds the central longitudinal axis L, just like the inner wall segment 6, in ring shape. The inner wall segment 6, the bottom 7, and the outer wall segment 8 of the housing thereby enclose a housing space 9 of the housing 2 that is configured as a ring space, surrounding the central longitudinal axis L in ring shape, which space also has a ring-shaped opening 11 on its end face that lies opposite the bottom 7.

Proceeding from the bottom 7, the outer wall segment 8 has a first step 12 that makes a transition into a wall section 13 at its end facing away from the bottom 7. The inner surface of the wall section 13 assigned to the housing space 9 is configured as a slanted surface 14, in that it is shaped conically slanted with reference to the central longitudinal axis L, in the manner of the inner surface of a funnel, so that the housing space 9 widens in the region of the wall section 13, in the direction of the opening 11 of the housing 2. In this regard, the acute angle β at which the inner surface 14 is oriented with reference to the central longitudinal axis L is 20°, for example.

A wall section 15 that ultimately surrounds the central longitudinal axis L is formed on the wall section 13 of the wall segment 8 provided with the slanted inner surface 14, and its inner surface is oriented axis-parallel to the central longitudinal axis L. With its free edge, the wall section 15 delimits the opening 11.

In the housing space 9, a ring-shaped damper mass 16 consisting of solid steel material is arranged; in the rest state shown in the FIGURE, it is oriented coaxial to the central longitudinal axis L. The inside diameter, the outside diameter, the height, and the shape of the damper mass 16 are selected in such a manner that the damper mass 16 never makes contact with the housing 2.

Accordingly, the damper mass 16 has an inner circumference surface 17 oriented axis-parallel to the central longitudinal axis L, a bottom surface 18 oriented normal to the central longitudinal axis L, as well as an outer circumference surface 19 arranged opposite the inner surface of the circumferential wall section 13.

Between the bottom surface 18 and the outer circumference surface 19, the damper mass 16 has a circumferential slanted surface 20 on its outer circumference, which surface runs parallel to the slanted surface 14 and accordingly sits in the segment of the housing space 9 delimited by the slanted surface 14 on its outer side, in the manner of a tip that narrows conically in the direction of the bottom 7 of the housing 2.

Between the slanted surfaces 14 and 20 of housing 2 and damper mass 16 that are assigned to one another, in this manner a gap 21 having a clear width WL is formed, which width is determined as the distance between the slanted surfaces 14 and 20, measured as a plumb line to the slanted surfaces 14, 20.

The damper mass 16 is held on a support element 24, which sits with play in the opening 11 of the housing 2, suspended by means of spring elements 22, 23, and in this manner the housing space 9 is delimited with reference to the surroundings U.

In the outer circumference surface of the support element 24, a ring seal 25 is recessed, which acts against the inner circumference surface of the outer wall segment 8 that delimits the opening, so that the joining gap that is present between the support element 24 and the wall segment 8 is sealed off.

The spring elements 22, 23 are formed in rod shape and sit in dead-end bore openings 26, which are formed in the damper mass 16 from the direction of their end face that is assigned to the support element 24. At their ends, the spring elements 22, 23, which consist of a conventional spring steel, such as, for example, the steel standardized under the designation 60MnSiCr4, have threaded pieces attached to them, in a usual manner, of which the one threaded piece is passed into a threaded opening of the support element 24, and the other threaded piece is passed through a passage opening formed in the bottom of the corresponding dead-end bore opening 26, and fixed in place by means of a nut 27 screwed onto the end of the threaded piece that projects beyond the bottom surface 18, from the direction of the outer side of the damping mass 16.

The support element 24 can be displaced over a distance A of 1 mm, for example, measured axis-parallel to the central longitudinal axis L, in the opening 11, axis-parallel to the central longitudinal axis L, so as to adjust the spacing of the damper mass 16 and concomitantly the clear width WL of the gap 21. In this regard, the effective length of the spring elements 22, 23, measured axis-parallel to the central longitudinal axis L, is dimensioned in such a manner that even if the support element 24 is maximally pushed into the opening 11, the clear width is WL>0.

In order to make adjustability of the support element 24 in the axial direction X within the opening 11 possible, a step 28 that surrounds the central longitudinal axis L is formed in the inner edge region of the holding segment 3 of the housing 2 assigned to the housing space 9, in which step the inner edge region 29 of the support element 24 sits with play.

The joining gap present between the inner circumference surface of the holding segment 3 and the inner outer circumference [sic] of the support element 24 is sealed off by means of a ring seal 30 that is recessed into the inner circumference surface of the inner wall segment 6 and acts against a circumferential guide step 31 of the support element 24, which step projects into the housing space 9.

Between the inner edge region 29 of the support element 24 and the bottom of the step 28, oriented normal to the central longitudinal axis L, an elastic element 32 is arranged, which counters compression with an elastic reaction force oriented axis-parallel to the central longitudinal axis L.

As setting elements 33 for adjusting the axial position of the support element 24 in the opening 11, screws oriented axis-parallel to the central longitudinal axis L are provided, which screws are passed through passage bores arranged in the inner edge region 29 of the support elements 24, distributed at regular angular intervals about the central longitudinal axis L, and screwed into threaded dead-end bores 34 formed in the holding segment 3. Accordingly, by tightening the setting elements 33, the support element 24 can be recessed in the opening 11, counter to the elastic reaction force exerted by the elastic element 32, until the block height of the elastic element 32 and thereby maximum recessing are achieved.

Concomitantly with the movement of the support element 24, directed into the housing space 9, the clear width WL of the gap 21 between the slanted surfaces 14 and 20 of housing 2 and damper mass 16 is reduced. The minimum gap width WL has been reached when the support element 24 has been recessed to its maximum depth into the opening 11 of the housing space 9.

If the clear width WL of the gap 21 is supposed to be increased, then the setting elements 32 are released and the support element 24 is raised by means of the reaction force exerted by the elastic element 32, so that the distance between the damper mass 16 and the bottom 9 of the housing 2 and concomitantly the width WL of the gap 21 are increased.

The housing space 9 is completely filled with a viscous damper fluid, namely an oil of the type HLP46 (in accordance with DIN 51524 Part 2), for example, which fluid in particular also fills the gap 21. Due to the relative movement of the closely adjacent slanted surfaces 14, 20 that takes place there during use, internal friction occurs in the damper fluid, specifically in the gap 21, which friction brings about effective damping of the oscillating movements of the damper mass 16.

By means of the possibility of adjustment of the gap width WL described here, the friction that occurs in the damper fluid in the gap 21 and concomitantly the damping behavior of the device 1 can be influenced directly.

REFERENCE SYMBOLS 1 device for vibration damping
2 housing
3 holding segment of the housing 2
4 central opening of the housing 2
5 passage openings
6 inner wall segment of the housing 2
7 bottom of the housing 2
8 outer wall segment of the housing 2
9 housing space of the housing 2
10 end face of the housing 2, lying opposite the bottom
11 ring-shaped opening of the housing 2
12 step of the outer wall segment 8
13 wall section of the outer wall segment 8
14 slanted surface of the housing 2
15 wall section of the outer wall segment 8
16 damper mass
17 inner circumference surface of the damper mass 16
18 bottom surface of the damper mass 16
19 outer circumference surface of the damper mass 16
20 slanted surface of the damper mass 16
21 gap
22, 23 spring elements
24 support element
25 ring seal
26 dead-end bore openings
27 nut
28 step
29 inner edge region of the support element 24
30 ring seal
31 guide step
32 elastic element
3 setting elements
34 threaded dead-end bores
A distance
β angle
L central longitudinal axis of the device 1
U surroundings
WL clear width of the gap 21
X axial direction

The invention claimed is:

1. A device for damping the vibrations of a spindle of a machine tool, which spindle rotates about an axis of rotation, wherein the device has a central longitudinal axis oriented coaxial to the axis of rotation of the spindle during use, as well as a housing that is provided for coupling to the spindle in a torque-proof manner, and encloses a ring-shaped housing space that is configured as a ring space oriented coaxial to the central longitudinal axis and surrounds the central longitudinal axis, a ring-shaped damper mass that is arranged in the housing space so as to be movable relative to the central longitudinal axis, and is oriented coaxial to the central longitudinal axis in the rest state, and comprises at least one spring element, by way of which the damper mass is movably held on the housing with elastic resilience, with reference to the central longitudinal axis of the device, at least in the circumference direction of the damper mass, wherein a gap is present between a circumference surface of the damper mass and an inner surface of the housing, which gap is filled with a viscous damper fluid, and that the clear width of the gap filled with the viscous fluid is adjustable.

2. The device according to claim 1, wherein the spring element is resiliently elastic in a direction oriented axis-parallel to the central longitudinal axis, in a direction oriented radial to the central longitudinal axis and/or in a direction oriented in the circumference direction of the damper mass.

3. The device according to claim 2, wherein the spring element is configured in rod shape and its longitudinal axis is oriented axis-parallel to the central longitudinal axis in the rest state.

4. The device according to claim 1, wherein the damper mass is held on the housing by means of at least three spring elements.

5. The device according to claim 4, wherein the spring elements are arranged distributed about the central longitudinal axis at regular angle intervals.

6. The device according to claim 1, wherein the gap filled with the viscous fluid is configured between a first slanted surface that is configured on the outer circumference of the damper mass and is oriented at a slant with reference to the central longitudinal axis, and a second slanted surface, which is arranged on the inner side of the housing assigned to the housing space, opposite to the slanted surface of the damper mass, and oriented at a slant in accordance with the slanted orientation of the first slanted surface with reference to the central longitudinal axis, and that a setting apparatus is provided for adjusting the relative position of damper mass and housing in a direction oriented axis-parallel to the central longitudinal axis.

7. The device according to claim 6, wherein the slanted surfaces of damper mass and housing are each configured as conical surfaces that surround the central longitudinal axis.

8. The device according to claim 6, wherein the slanted surfaces are oriented parallel to one another.

9. The device according to claim 6, wherein the setting apparatus for adjusting the relative position of damper mass and housing comprises a support element that is held on the housing axis-parallel to the central longitudinal axis in a corresponding axial position, in a displaceable manner, and is coupled to the at least one spring element that holds the damper mass, on the housing side, and a setting element that acts between the housing and the support element, which element holds the support element in the corresponding axial position.

10. The device according to claim 9, wherein the support element is configured as an element that encloses the central longitudinal axis in ring shape.

11. The device according to claim 9, wherein the support element sits in an opening that is provided on an end face of the housing, and that the support element seals off the housing space relative to the surroundings at this end face.

12. The device according to claim 1, wherein the housing space is completely sealed off relative to the surroundings, and that the housing space is filled with the viscous damper fluid.

13. The device according to claim 1, wherein the viscous damper fluid is an oil having a rated viscosity>5 $mm^2/s$.

14. The device according to claim 1, wherein the clear width of the gap filled with the viscous fluid is 0.1-1.0 mm.

* * * * *